United States Patent
Wen et al.

(10) Patent No.: US 8,887,234 B2
(45) Date of Patent: Nov. 11, 2014

(54) NETWORK SERVICE SELECTION AND AUTHENTICATION AND STATELESS AUTO-CONFIGURATION IN AN IPV6 ACCESS NETWORK

(75) Inventors: HaiBo Wen, Shanghai (CN); RenXiang Yan, Shanghai (CN); KeYao Zhu, Shanghai (CN); YingLan Jiang, Shanghai (CN); XuDong Zhu, Shanghai (CN); FanXiang Bin, Shanghai (CN); QingShan Zhang, Shanghai (CN)

(73) Assignee: Alcatel Lucent, Boulogne-Billancourt (FR)

( * ) Notice: Subject to any disclaimer, the term of this patent is extended or adjusted under 35 U.S.C. 154(b) by 1747 days.

(21) Appl. No.: 11/226,215

(22) Filed: Sep. 15, 2005

(65) Prior Publication Data
US 2006/0080728 A1 Apr. 13, 2006

(30) Foreign Application Priority Data
Oct. 12, 2004 (CN) .......................... 2004 1 0067089

(51) Int. Cl.
*H04L 29/06* (2006.01)
*H04L 29/12* (2006.01)
*H04L 12/28* (2006.01)

(52) U.S. Cl.
CPC ............ *H04L 63/08* (2013.01); *H04L 61/2015* (2013.01); *H04L 69/16* (2013.01); *H04L 12/2859* (2013.01); *H04L 69/167* (2013.01); *H04L 69/168* (2013.01)
USPC .............................................. 726/3; 713/168

(58) Field of Classification Search
CPC ......... H04L 63/08; H04L 41/08; H04L 45/58; G06F 21/30; G06F 21/44
See application file for complete search history.

(56) References Cited

U.S. PATENT DOCUMENTS

2003/0091030 A1* 5/2003 Yegin et al. ................... 370/352
2003/0204635 A1 10/2003 Ko et al.
(Continued)

FOREIGN PATENT DOCUMENTS

CN 1431836 A 7/2003
CN 1527560 A 9/2004
(Continued)

OTHER PUBLICATIONS

Salman Asadullah et al, "ISP IPv6 Depolyment Scenarios in Broadband Access Networks", IETF Standard Working Draft, Internet Engineering Task Force, IETF, CH, Aug. 2004, XP015010354.
(Continued)

*Primary Examiner* — Izunna Okeke
(74) *Attorney, Agent, or Firm* — Harness, Dickey & Pierce

(57) ABSTRACT

The present invention provides a method for network service selection and authentication in an IPv6 access network, a scheme for stateless auto-configuration and devices thereof. A NSP Information option containing the IPv6 address of a NSP edge router and a NSP name is defined in RA messages. A NSSA Information option is defined in RS option fields. The present invention enables IPv6 stateless auto-configuration in an access network. The new NSP Information option, the way of "one time authentication per subscriber network per NSP" and the use of IPv6 routing header promote the efficiency of IPv6 stateless auto-configuration and reduce the NSP selection and authentication traffic. The present invention provides an efficient solution for network service selection and authentication without introducing any other message exchange between terminals and access nodes. In short, the scheme of network service selection and authentication according to the present invention is piggybacked on RS/RA messages, which is very simple.

15 Claims, 4 Drawing Sheets

(56) References Cited

U.S. PATENT DOCUMENTS

| | | | |
|---|---|---|---|
| 2003/0212774 A1* | 11/2003 | Lee et al. | 709/222 |
| 2004/0090937 A1* | 5/2004 | Chaskar et al. | 370/331 |
| 2004/0158639 A1* | 8/2004 | Takusagawa et al. | 709/229 |
| 2005/0020265 A1 | 1/2005 | Funabiki et al. | |

FOREIGN PATENT DOCUMENTS

| | | |
|---|---|---|
| EP | 1367772 A1 | 12/2003 |
| JP | 2004-007578 A | 1/2004 |
| WO | WO 03/102711 A2 | 12/2003 |
| WO | WO 2005/072276 A2 | 8/2005 |

OTHER PUBLICATIONS

O. Troan et al, "IPv6 Prefix Options for Dynamic Host Configuration Protocol (DHCP) version 6", IETF Standard, Internet Engineering Task Force, IETF, CH, Dec. 2003, XP015009415.

Patrik Flykt, "AAA for IPv6 Network Access draft-perkins-aaav6-05.text", IETF Standard-working-Draft, Internet Engineering Task Force, IETF, Ch, No. 5, Mar. 1, 2002, XP015004814.

* cited by examiner

NETWORK SERVICE SELECTION AND AUTHENTICATION AND STATELESS AUTO-CONFIGURATION IN AN IPV6 ACCESS NETWORK

FIELD OF THE INVENTION

The present invention relates to an IPv6 access network, in particular, example embodiments relate to a method for network service selection and authentication based on RS (Router Solicitation)/RA (Router Advisement) messages in an access network, a solution for IPv6 stateless auto-configuration in an access network, and related devices thereof.

DESCRIPTION OF THE RELATED ART

With the rapid development of the Internet, IPv6 is becoming more and more mature. Because IPv6 provides such a vast number of available addresses, nearly every electrical device in the world could be connected to the Internet and the access network will become an "always-on" network. At the same time, the character of Plug & Play is becoming more important. The mechanism of IPv6 stateless auto-configuration can not only be used for realizing Plug & Play, but also be used for making the network more flexible. However, directly applying IPv6 stateless auto-configuration into access work that can be operated will cause severe security and other problems, which will be discussed as follows.

FIG. 1 shows an IPv6 access network architecture. All terminals in the subscriber network are IPv6 nodes, and the access node operate as a layer3 device that combines the functions of an IPv6 router and some management functions.

In the standard IPv6 stateless configuration, a router (or a layer3 access node) sends out, to a directly attached link, two kinds of Router Advertisement (RA) messages: (1) periodic unsolicited Router Advertisement messages; (2) Router Advertisement messages in response to Router Solicitations (RS). The RS/RA messages are encapsulated in ICMPv6 packets. Within the RA messages, global IP prefixes are carried. Thus, all the terminal interfaces on this link can obtain the IPv6 prefixes to form their global IPv6 addresses by appending their own interface identifier to the IPv6 prefixes, i.e., IPv6 address=IPv6 prefix+interface identifier.

Because IPv6 stateless auto-configuration is designed for an open friendly network environment without taking this into consideration from telecommunication operators' viewpoints, directly applying the standard IPv6 stateless configuration into an access network that can be operated will cause many problems. For example, in a standard IPv6 router, any unauthenticated user's terminal could automatically obtain its global IPv6 prefix from RA messages and form its IPv6 address, thereby enjoying the network services. Besides, if the access node is a standard IPv6 router, since no status information has been maintained in the access node, it is hard to support anti-spoofing filter. Some effective mechanisms should be provided first so as to apply the IPv6 stateless configuration to operators' access network.

In future IPv6 access networks, different terminals in a subscriber network can simultaneously enjoy different services from different Network Service Provider (NSP). Thus, how to effectively realize NSSA (Network Service Selection & Authentication) from multiple NSPs in IPv6 access network should be taken into consideration. In an IPv4 access network, NSSA is done for each terminal, which is not an effective mechanism for IPv6 access network. With respect to the models of Network Service Selection & Authentication, traditionally there are four kinds of models, i.e., PPP model, Web portal model, DHCP model and 802.1x model. However, the efficiency of applying these four models to the IPv6 stateless auto-configuration access network is not good enough. The present invention will depict these four models in a simple way:

(1) PPP Model

In a PPP model, firstly, Link Control Protocol (LCP) is used to establish the PPP link. Then network service selection and authentication is done. This model has some disadvantages: in future IPv6 access network, there may be more terminals within a subscriber network and they want to access the same NSP, and each terminal must establish a PPP session with the same NSP. In addition, the PPP model could not take advantage of multicast streams, for multicast packets will be duplicated inside every PPP tunnel. Obviously, a lot of bandwidth is spoiled. In addition, PPPv6 could not provide a global IPv6 address for the subscribers, so DHCPv6 or stateless address auto-configuration scheme is still needed to configure the global IPv6 addresses and other configuration information. Obviously, this will add the complexity to the network architecture.

(2) Web Portal Model

Terminals in a subscriber network use their link-local IPv6 addresses to communicate with the web portal located in the access provider network. From the web portal, the user is able to select a desired NSP and provide necessary authentication information. This model can be used in a network environment where terminals are all PCs, but an IPv6 network in the future will include terminals that cannot contact with web portal (e.g., IP phones).

(3) DHCP Model

DHCPv6 has a "User Class" option, which can be used to contain a username, a desired NSP, and user's authentication information. To realize this model, there are two schemes: a DHCPv6 server is located in the same subnet as terminals, or a DHCPv6 relay agent is implemented in an access node used to relay DHCPv6 messages to the corresponding DHCPv6 server, then the authentication is done. In this model, DHCPv6 clients must be realized in the terminals. After completing service selection and authentication, the mechanism of stateless auto-configuration (e.g. Router Solicitation and Router Advertisement messages) should be used for configuration of terminals in the network.

(4) 802.1x Model

IEEE 802.1x is now a very popular authentication mechanism for clients connected to an IEEE 802 network. However, an IEEE 802 network can be used for layer 2 authentication and layer 2 network service selections. Since in our network architecture, the access node is a layer 3 device, other mechanisms are still needed for layer 3 network service selection (e.g., to relay the service selection and authentication information to a desired NSP). On successful authentication, Router Solicitation and Router Advertisement messages must be used for other configuration (e.g., global address configuration) in stateless auto-configuration. This model has lower efficiency in our network architecture with IPv6 stateless auto-configuration mechanism.

The above four models have corresponding disadvantages, thus an effective method for Network Service Selection and Authentication adaptive to IPv6 stateless auto-configuration access network is necessarily to be designed.

Further, every terminal in a subscriber network can enjoy at the same time services provided by different NSP. The interface between an access node and a subscriber network will advertise IPv6 prefix information from different NSPs, so how to make selection among these prefix information is a problem that should be solved. Besides, how to relay various data of a subscriber network quickly and correctly to corresponding NSP networks by the access node is also a necessary problem to solve when applying IPv6 stateless auto-configuration into access network.

SUMMARY OF THE INVENTION

With respect to an aspect of the present invention, one problem to be solved lies in how to realize IPv6 stateless auto-configuration in access network and design an effective solution to make IPv6 access network with IPv6 stateless auto-configuration more manageable for the operator. Through this, 1) stateless auto-configuration can be easily used in IPv6 access network without introducing any potential problems; 2) NSP selection can be easily done by this solution.

Operators want to control his/her network, but the IPv6 stateless auto-configuration cannot provide operators with any method for control, and there is no solution that can be operated for applying IPv6 stateless auto-configuration in access network.

The invention proposes an effective solution, which enables the IPv6 access network to support IPv6 stateless auto-configuration. The basic ideas are as follows:

In one example embodiment one time authentication per subscriber network per NSP. Because the user owns his subscriber network, the terminals in his network are friendly to each other. Once there is a terminal that has fulfilled its NSP selection and authentication, it's not necessary for any other terminals to do authentication with the same NSP.

In another example embodiment, a definition of a new option, i.e., NSP Information option, for RA messages. This new option must be used along with an appropriate Prefix Information option containing the prefix allocated by the NSP, to deliver NSP Information (e.g., edge router address and NSP name) to the terminals. Each terminal can easily find an appropriate prefix in RA messages to transfer its packets to a desired NSP.

In another example embodiment, to use Type 0 Routing Header to transfer packets to a correct NSP network. The use of Type 0 Routing Header enables the access node to select an appropriate path quickly and relay the data to the corresponding NSP network.

Also, periodic authentication makes the networks more secure.

Thus, the present invention provides a method for IPv6 stateless auto-configuration in access network, wherein an access node sends RA messages, including NSP Information option and Prefix Information option, to a subscriber network. The said NSP Information option includes an IPv6 address of NSP edge router and a NSP name. In RA messages, the NSP Information option and the corresponding IPv6 Prefix Information option always exists in pairs, Also, in the subscriber network, a terminal that wants to visit a NSP searches the RA messages to find whether there is the NSP Information option and the corresponding Prefix Information option belonging to the said NSP, Additionally, the terminal gets the prefix belonging to the NSP through the RA messages, and its global IPv6 address can be obtained by appending its interface identifier to the prefix.

The present invention also provides an IPv6 terminal, including a process module, a network interface module and a store module, wherein the terminal receives RA messages from an access node over the network interface module, the messages includes a NSP Information option which includes an address of NSP edge router and NSP name. Also, in the RA messages, the NSP Information option and the corresponding Prefix Information option always exists in pairs, the process module processes the RA messages and stores the address of NSP edge router and NSP name in the store module.

If a terminal wants to visit a NSP, the process module searches the RA messages to find whether there is the NSP Information option and the corresponding Prefix Information option belonging to the NSP.

The process module of the terminal gets the prefix belonging to the NSP through the RA messages, and obtains its global IPv6 address by appending its interface identifier to the prefix.

The present invention further provides an IPv6 access node, including a process module, a network interface module and a store module, wherein
[the process module generates RA messages in accordance with an IPv6 address and a NSP name stored in the store module. The RA messages contain a NSP Information option which includes the IPv6 address of a NSP edge router and a NSP name. In the RA messages, the NSP Information option and the corresponding IPv6 Prefix Information option always exist in pairs, and the access node sends the RA messages over the network interface module to a subscriber network.

The access node sends the RA messages to the subscriber network over the network interface module by the NSP Information option and the Prefix Information option pair.

With respect to another example embodiment of the present invention, the technical problem to be solved thereof lies in proposing a new effective method for the NSSA problem.

As to the problem, the present invention proposes an effective solution for making a network service selection and an authentication more effective by utilizing Router Solicitation/Router Advertisement (RS/RA) messages. The basic ideas therein are depicted as follows.

RS/RA messages are mandatory in an IPv6 network. The information for NSSA can be piggyback on these messages.

To define a new option (i.e., NSSA Information option) for RS messages. This new option can be used to deliver the user's information in RS messages for network service selection and user authentication. NSP Information option in RA messages can be used along with Prefix Information option to identify the prefix assigned by a specified NSP.

Therefore, the present invention provides a method for NSP service selection and authentication in an IPv6 access network, wherein terminals in a subscriber network send RS messages to an access node, the RS messages includes a NSSA Information option, which contains user's information for the network service selection and authentication.

the access node extracts user information from the NSSA Information option, and communicates with a corresponding AAA server for authentication.

Upon authentication, NSP prefix is obtained, and the access node sends out the obtained NSP information and prefix information to the subscriber network with the NSP Information option and the Prefix Information option in RA messages. The NSP Information option contains the address of NSP edge router and the NSP name, and the NSP Information option and the corresponding Prefix Information option in the RA messages exist in pairs.

The present invention further provides an IPv6 terminal, including a process module, a network interface module and a store module, wherein the process module generates RS messages, the RS messages contain a NSSA Information option, which includes users' NSSA information, and the terminal sends the RA messages over the network interface module to an access node.

The RA messages that said terminal received over the network interface module from the access node contain a NSP Information option which includes the address of a NSP edge router and a NSP name, the NSP Information option and the corresponding Prefix Information option in the RA messages exist in pairs. The process module processes the RA messages and stores the address of NSP edge router and the NSP name to the store module.

The present invention further provides an IPv6 access node, including a process module, a network interface module and a store module, wherein the access node receives RS messages from a terminal over a network interface, the process module extracts user information from a NSSA Information option of the received RS messages, and communicates with a corresponding AAA server for authentication. Also, the NSSA Information option contains user information for NSSA.

Upon authentication, the process module generates RA messages in accordance with the NSP information and the Prefix information obtained and stored in the store module. The RA messages contain a NSP Information option and a Prefix Information option. The NSP Information option contains the address of a NSP edge router and a NSP name, the NSP Information option and the corresponding Prefix Information option in the RA messages exist in pairs. The access node sends the NSP information and the Prefix information to a subscriber network through the RA messages over the network interface module.

DETAILED DESCRIPTION OF THE EMBODIMENTS

Figure 1:
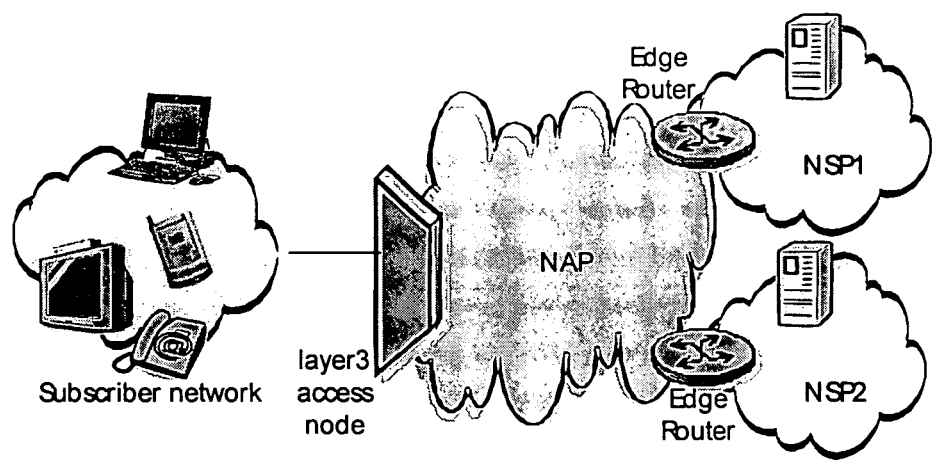
FIG. 1 shows an IPv6 access network architecture.
Figure 3:
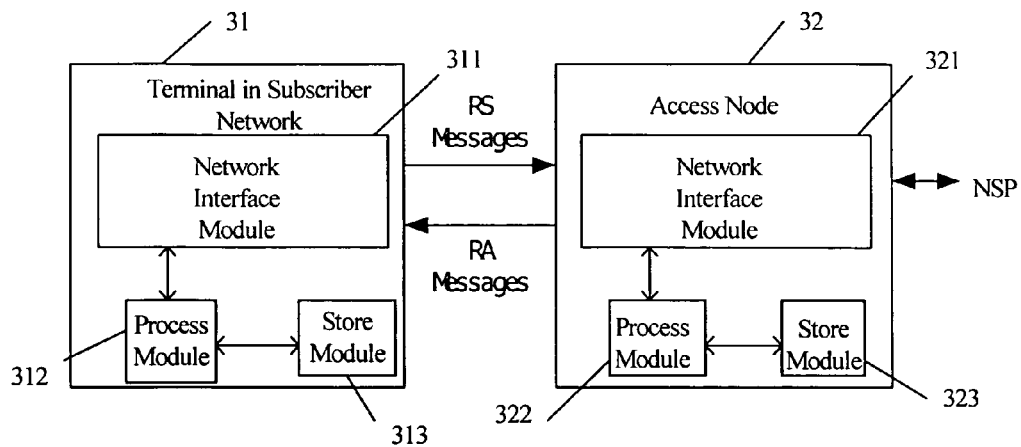
FIG. 3 is a diagram showing a user terminal and an access node of the IPv6 access network architecture in FIG. 1.

FIG. 3 is a diagram showing a user terminal 31 and an access node of the IPv6 access network architecture 101 in FIG. 1, wherein, user terminal 31 in the subscriber network and access node 32 receive/send RS and RA messages over network interface modules 311 and 321. Each of process modules 312 and 322 and store modules 313 and 323 takes its own operation respectively.

With Respect to IPv6 Stateless Auto-Configuration in Access Network RA messages belong to neighbor discovery protocol (NDP), which is essential in IPv6.

In example embodiments, a format of Type 0 Routing Headers may be used in IPv6.

How to forward IP packets from subscriber network to the correct NSP is a very important problem in an access network. Among IPv6 extension headers, the Routing header is used by an IPv6 source to list one or more intermediate nodes to be "visited" on the way to a packet's destination. A type 0 Routing Header can be used to address packet-forwarding problem in an access network. An Example of the format of Type 0 Routing Header is following.

The detail of this format can be referred to RFC2460. In our solution, we just specify an intermediate router address (i.e., the address of NSP edge router). So there is only one "Address" field in Routing Header. The field "Hdr Ext Len" (length of this extension header) is set to 2. "Segments left" is set to 1. And in specific use of type 0 Routing Header, field "Address [1]" is set to the IPv6 address of the packet's final destination.

A Definition of a New Option for RA Messages—NSP Information Option is as following.

In order to use type 0 Routing Header, user terminals 31 must know the IPv6 address of NSP edge router. Here, a new option, called NSP Information option, is defined to deliver the IPv6 address of NSP edge router to user terminals 31. This option must be used along with the corresponding Prefix Information option in RA messages, thus the terminals can easily know the desired prefix and IPv6 address of desired NSP edge router. The format of this new option is following.

The new option may include a length 8-bit unsigned integer. The length of the option (including the type and length fields) is in units of 8 octets. The value 0 is invalid. Nodes MUST silently discard an NDP packet that contains an option with length zero.

The option may have a reserved this 16-bit field that is unused. However, the option must be initialized to zero by the sender and must be ignored by the receiver.

The new option may have a NSP Edge Router Address the IPv6 address of a NSP edge router.

The NSP Name This field has a variable length, but it must guarantee that the whole length of this option is in units of 8 octets. Terminals use this field to identify the prefix of the desired NSP.

Description the NSP Information option provides terminals with the IPv6 address of NSP edge router and NSP name. This option is advertised along with the corresponding IPv6 Prefix Information option. In the RA message, the NSP Information option is always followed by Prefix Information option. Thus, in access network, the NSP Information option and the Prefix Information option must exist in pairs. All IPv6 packets originated from the terminal that is enjoying this NSP's service must use the address of edge router in their Routing Headers.

The NSP Information option can only appear in router advertisement packets, and other messages containing the option MUST be silently ignored.

In a subscriber network, if there is no terminal that wants to visit a specified NSP, the access node will not obtain any IPv6 prefix from that NSP. If there are some nodes that enjoy the service from a specified NSP, process module 322 of the access node 32 will obtain an appropriate IPv6 prefix from the corresponding NSP over network interface module 321, and stores it in store module 323. The access node 32 will periodically send out the corresponding RA messages by the process module 322 over the network interface module 321.

Figure 2:
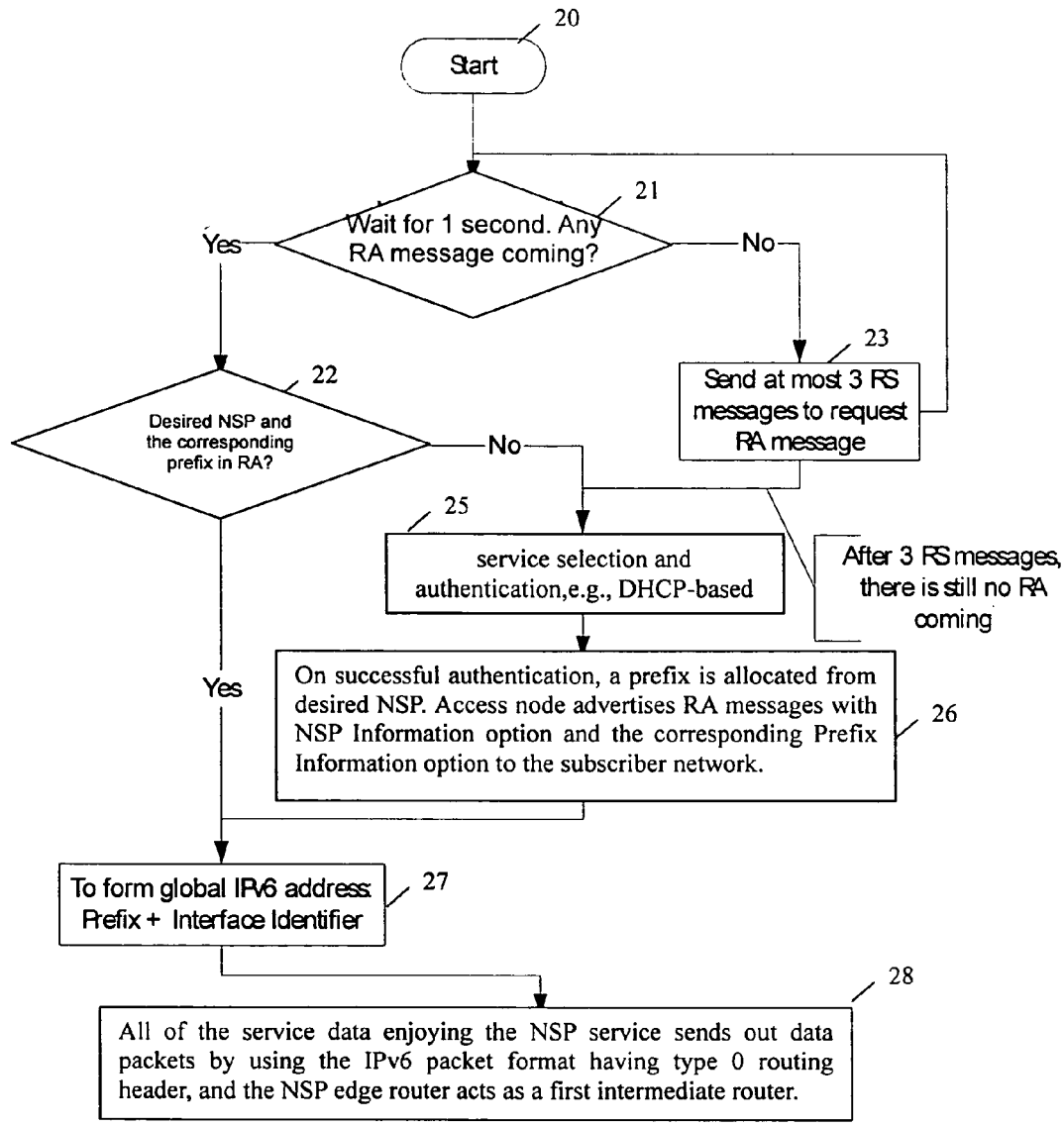
FIG. 2 is a flow chart illustrating stateless auto-configuration of an access network according to the present invention.

Once there is a terminal (e.g., PC1) that wants to visit a specified NSP (e.g., NSP1 in FIG. 1), it must do following steps to fulfill its stateless configuration (FIG. 2), In step 21, process module 312 of PC1 waits for MAX_RTR_SOLICITATION_DELAY(MAX_RTR_SOLICITATION_DELAY is 1 second, which is defined in RFC2461) to see whether any RA messages comes.

If RA messages are received over the network interface module 311, in step 22 process module 312 of PC 1 tries to find whether there is a prefix belonging to the desired NSP (NSP1) in the RA messages If there is a prefix belonging to NSP1, this means that another terminal has made authentication with NSP-1 and it's not necessary to do NSP selection and authentication with NSP 1 again. Go to step 27. If there another terminal has not made a connection with continue to step 27.

In step 23, if there is no RA message, the terminal actively sends out Router Solicitation messages over the network interface module 311 by the process module 312. If there are RA messages, do the same action as that in step 21. After MAX_RTR_SOLICITATIONS (MAX_RTR_SOLICITATIONS is 3 transmissions, which is defined in RFC2461) RS messages, if there is still no RA message, go to step 25.

In step 25, NSP service selection and authentication is done. The NSP service selection and authentication may adopt several of ways, e.g., basing on 802.1x or the manner of DHCP authentication. In case of DHCP service selection and authentication, for example, the process module 312 of PC1 can trigger Dynamic Host Configuration Protocol for IPv6 (DHCPv6) client to do NSP selection and authentication with "User Class" option. This option could contain the username, the desired NSP (here NSP is NSP1), and the user's authentication information. To make the authentication far away from attack, DHCPv6's "Authentication" option could be used. Within this step, the link-local IPv6 address can be used as its source address and All DHCP_Relay_Agents_and_Servers multicast address as its destination address.

The DHCPv6 relay agent in the access node can relay the message to the DHCP server (AAA server) located in the desired NSP1 to do authentication.

In step 26, on successful authentication, an appropriate prefix is allocated to this subscriber's network by the NSP1. The assignment of this prefix is notified to the access node 32 (e.g., through DHCPv6 Prefix Delegation option), and is stored by the store module 323. Then the access node 32 sends out RA messages to the subscriber network through NSP Information option and Prefix Information option pair over the network interface module 321. The process module 322 generates the RA messages containing the IPv6 address of the NSP edge router, NSP name, and the allocated prefix information;

In step 27, once the terminal gets the prefix from the desired NSP, the process module 312 can obtain its global IPv6 address by appending its interface identifier to the prefix.

In step 28, any packets originated from the terminal can use Type 0 Routing Header with the desired NSP edge router's address to enjoy service from the desired NSP. Of course, in order to make the network more robust, access node should support anti-spoofing, which means to check whether the packets from an IPv6 address could enjoy the services from the specified NSP by using longest prefix mapping with the prefix allocated to this subscriber network.

In this solution, each subscriber network just makes an authentication with a desired NSP. The following terminals just look into the RA's NSP Information option and Prefix Information option pair to get the appropriate prefix assigned by the desired NSP. This can be called "one time authentication per subscriber network per NSP", which promotes the speed of auto-configuration. Also the "one time authentication per subscriber network per NSP" reduces the NSP selection and authentication traffic in the network and also the authentication requests to the corresponding DHCP server (AAA server).

In order to make the network more robust, NSP may require its subscriber network to do periodic authentication. For this purpose, when the prefix is firstly assigned to the subscriber network, the preferable time of this prefix can be set to an appropriate time (e.g., 1 day). Also, the expiration of an address's preferable time for a terminal will trigger a DHCPv6 Renew message to the corresponding authentication server and request to extend the preferable time of the prefix. Within this message, "User Class" option must be included.

The invention makes the implementation of IPv6 stateless auto-configuration in an access network possible. The new NSP Information option, the method of "one time authentication per subscriber network per NSP", and the use of IPv6 Routing Header promote the efficiency of IPv6 stateless auto-configuration, and also reduce the NSP selection and authentication traffic.

Periodic authentication provides a method for the NSP to control its service, and thus the network is more robust.

With Respect to NSP Service Selection and Authentication Based on RS/RA messages all the terminals in a subscriber network are IPv6 nodes, and the access nodes are operated as layer3 devices that combine the functions of IPv6 router and some management functions.

As mentioned above, in a standard IPv6 stateless configuration, a router (or layer3 access node) sends, periodically or in response to Router Solicitation (RS), Router Advertisement (RA) messages out its advertising interfaces. Thus, all the terminals can obtain the IPv6 prefixes to form their global IPv6 addresses by appending their interface identifier to the IPv6 prefixes.

When the interface of an IPv6 terminal becomes enabled, the terminal may be unwilling to wait for the next unsolicited RA message to locate default routers or learn prefixes. To obtain RA messages quickly, a terminal should transmit up to MAX_RTR_SOLICITATIONS (It is defined in RFC2461. MAX_RTR_SOLICITATIONS is 3 transmissions.) Router Solicitation (RS) messages each separated by at least RTR_SOLICITATION_INTERVAL(ItisdefinedinRFC2461. RTR_SOLICITATION_INTERVAL is 4 seconds.) According to this scheme, we can use RS/RA messages for network service selection and authentication. A new option (i.e., NSSA Information option) can be defined to deliver user's information for NSSA. In RA messages, there may be some different prefixes that come from different NSPs. To provide convenience for the terminal to do correct selection of prefix, the NSP information (e.g., the NSP name of this prefix) must be also included in the NSSA Information option.

Only Source Link-Layer Address option can be used in RS's Options field. In order to deliver user's information for NSP selection and authentication, Network Service Selection and Authentication (NSSA) Information option must be defined, The option may have a 8-bit unsigned integer. The length of the option (including the type and length fields) is in units of 8 octets. Using a value 0 in the option is invalid. Nodes MUST silently discard an ND packet that contains an option with length zero.

NSSA Data This field has a variable length, but it must guarantee that the whole length of this option is in units of 8 octets. It is used to contain user's information (e.g., username, the desired NSP, and the user's other authentication information) for network service selection and authentication in RS messages. The syntax of the field could be username@nsp.com:password or be other cipher text. To make the information far away from attack or steal, IPv6 Encapsulating Security Payload (ESP) Header or other enciphering methods can be adopted to ensure the security of user's information.

Description when this option exists in RS messages, it is used to deliver the user's information for network service selection and user authentication.

NSP Information option in RA messages should be used along with Prefix Information option to identify the prefix assigned by a specified NSP. In other words, in RA messages, NSP Information option and Prefix Information option must exist in pairs. Thus, RA messages may contain multiple pairs of this kind for different prefix from different NSPs.

Figure 4:
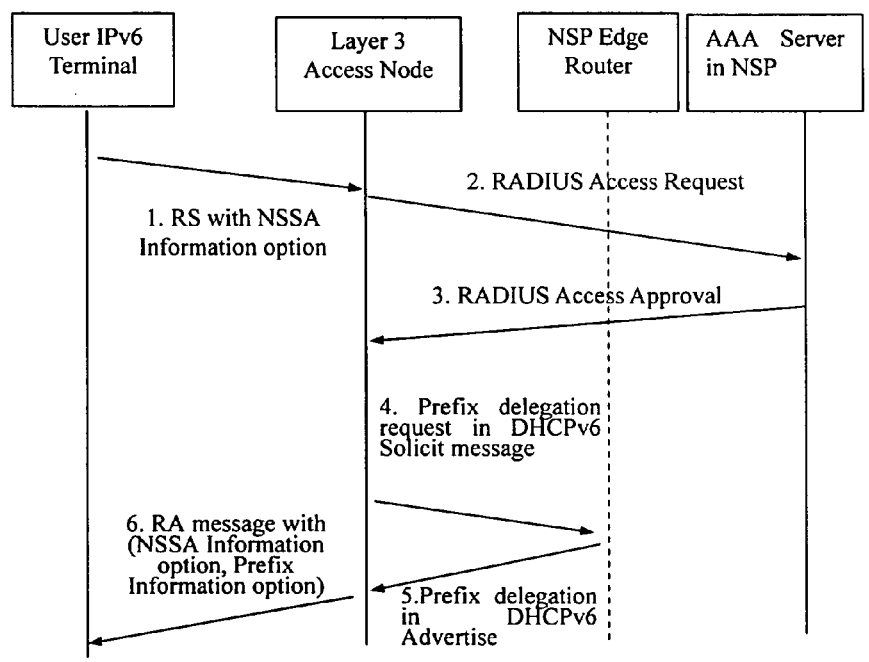
FIG. 4 shows a RS/RA solution for network service selection and authentication in IPv6 stateless address configuration according to the present invention.

FIG. 4 shows the RS/RA solution for network service selection and authentication in IPv6 stateless address configuration. An IPv6 user terminal maintains the NSP information for its desired NSP (e.g., NSP name) by process module 312, and the NSP information being stored in store module 313. The process module 322 extracts the user's information from NSSA Information option, and communicates with a corresponding AAA server for authentication. On successful authentication, the access node requests the prefix delegation from the corresponding NSP edge router, obtains the corresponding NSP information by process module 322, and stores it in store module 323. Then, the access node generates RA messages by the process module 322 and sends it with NSP Information option and Prefix Information option to subscriber network over the network interface module 321.

In FIG. 4, prefix allocation is assumed to be done by the NSP's edge router. In other cases, for example, prefix allocation may be done along the authentication with RADIUS through Framed-IP-Prefix attribute, thus step 4 and step 5 may be omitted.

By defining NSSA Information option, the RS messages generated by the terminal's process module 312 and sent out over the network interface module 311 can carry user's information for network service selection and authentication The RA messages generated by the process module 322 and sent out over the network interface module 321 can send the NSP information along with the Prefix Information option, network service selection and authentication can be easily and efficiently done along with RS/RA messages. The terminal can select the appropriate prefix to form its global IPv6 address with the information in the NSP Information option and Prefix Information option by the process module 312.

When the interface of an IPv6 terminal (network interface module 311) becomes enabled, process module 312 will send out a RS message to obtain a global prefix. To take good use of this feature, the invention provides an efficient solution for network service selection and authentication, which does not introduce any other messages' exchange between the terminals and the access node.

In short, our solution for network service selection and authentication is piggybacked on the RS/RA messages.

Figure 5:
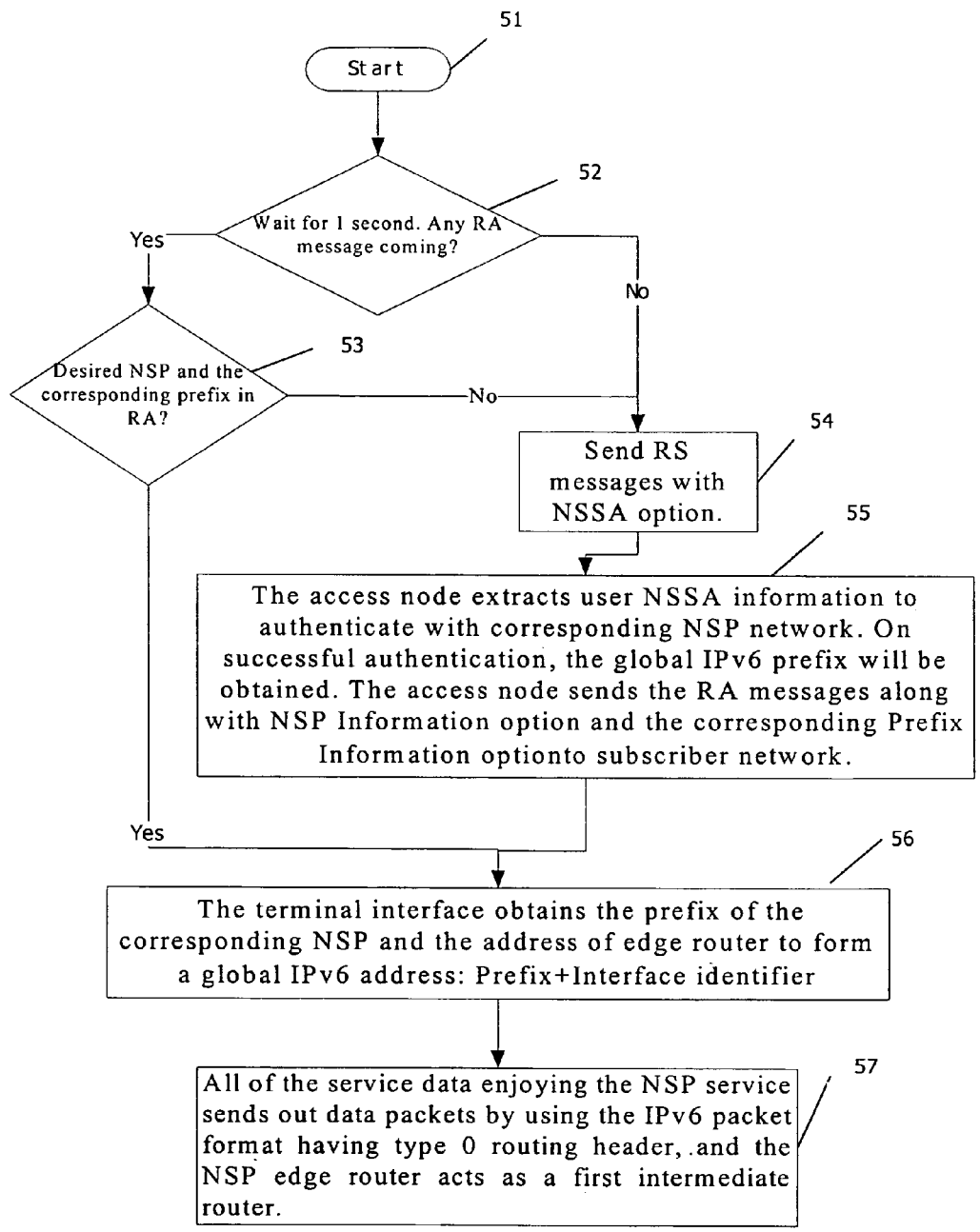
FIG. 5 is a flow chart showing the stateless auto-configuration in an access network adopting the RS/RA solution for NSSA according to the present invention.

FIG. 5 shows IPv6 stateless auto-configuration flow for NSP service selection and authentication based on RS/RA messages.

In a subscriber network, if a terminal wants to visit a desired NSP, in step 52, it waits for 1 second to see whether any RA message comes. If there is no RA message, the flow proceeds to step 54, and if some RA messages come, the process module 312 reviews in the RA messages to find whether there are the desired NSP and the corresponding prefix (and stores these information in store module 313). If there are the desired NSP and the corresponding prefix, the flow proceeds to step 56, and if there is no desired NSP and the corresponding prefix, the flow proceeds to step 54;

In step 54, user's terminal sends out the RS information carrying NSSA option by the process module 312 over the network interface module 311.

In step 55, process module 322 of the access node extracts user's NSSA information from the NSSA option in RS messages to authenticate with corresponding NSP network. On successful authentication, the global IPv6 prefix will be obtained and be stored in the store module 323. The access node sends out the RA messages along with NSP Information option and the matching Prefix Information option over network interface module 321 to subscriber network by the process module.

In step 56, the terminal obtains the prefix of the corresponding NSP and the address of the edge router (store it in the store module 323) to form global IPv6 address: Prefix+ Interface identifier.

What is claimed is:

1. A method for Network Service Provider (NSP) service selection and authentication in an IPv6 access network, the IPv6 access network having a subscriber network including at least two terminals, the method comprising:
   receiving Router Solicitation (RS) messages from a terminal in a subscriber network at an access node, the RS messages including a Network Service Selection and Authentication (NSSA) Information option, the NSSA Information option containing a user's information for network service selection and authentication;
   extracting, in the access node, the user's information from the NSSA Information option in the RS messages;
   obtaining, by the access node, authentication through communication with a corresponding Authentication, Authorization, and Accounting (AAA) server; and
   determining, at the access node, a NSP Information option and a Prefix Information option upon authentication;
   sending from the access node to the subscriber network Router Advertisement (RA) messages, the RA messages containing the NSP Information option and the Prefix Information option, the NSP Information option containing the address of the NSP edge router and a NSP name, the NSP Information option existing in a pair with the corresponding Prefix Information option in the RA messages such that a second one of the terminals within the subscriber network receives the NSP Information and forms a global IPv6 address associated therewith without authenticating with the NSP.

2. A method as claimed in claim 1, wherein the user's information for network service selection and authentication contains the user's name, the desired NSP and other authentication information of the user, the desired NSP being one of a plurality of available NSPs that each provide different services.

3. A method for IPv6 stateless auto-configuration in an access network, the access network having a subscriber network including at least a first terminal and a second terminal, comprising:
   receiving, at the first terminal, Router Advertisement (RA) messages from an access node of the subscriber network, the RA messages including a Network Service Provider (NSP) Information option and a Prefix Information option pair if any one of the terminals authenticated with the NSP through the access node, the NSP Information option including an IPv6 address of a NSP edge router and a NSP name, the NSP edge router being a node in the subscriber network configured to forward IPv6 packets between the terminals of the subscriber network and a rest of the access network, and the NSP Information option always existing in a pair with a corresponding IPv6 Prefix Information option in the RA messages;
   determining, at the first terminal, the NSP information option and the Prefix Information option from the RA messages received from the access node if any one of the terminals has authenticated With the NSP through the access node;
   appending, an interface identifier of the terminal in the subscriber network to the Prefix information option to form a global IPv6 address for the first one of the terminals if any one of the terminals authenticated with the NSP through the access node.

4. A method as claimed in claim 3, further comprising:
sending, by the first terminal of the subscriber network, Router Solicitation (RS) messages initiatively to obtain the RA messages if there is no RA message or the RA messages are void of the NSP information option when the first terminal of the subscriber network wants to visit the NSP.

5. A method as claimed in claim 4, further comprising:
making NSP service selection and authentication in the first terminal in the subscriber network if there are no RA messages containing the NSP information option after the sending by the first terminal of the subscriber network Router Solicitation (RS) messages initiatively to obtain a RA messages;
allocating and notifying, the prefix belonging to the NSP to the access node by the NSP.

6. A method as claimed in claim 3, wherein, packets originated from the first terminal in the subscriber network can use a routing header with IPv6 address of the said NSP edge router.

7. A method as claimed in claim 6, wherein,
the routing header sets the IPv6 address of the NSP edge router to be an intermediate router address.

8. A method as claimed in claim 3, further comprising:
checking, by the access node, whether the packets from an IPv6 address could use services from the corresponding NSP by using a longest prefix mapping with the prefix allocated to the subscriber network.

9. A method as claimed in claim 5, further comprising:
adopting, in the first terminal of the subscriber network, a DHCP-based service selection and authentication in the NSP service selection and authentication.

10. A method as claimed in claim 9, further comprising:
periodically authenticating, by the NSP, the subscriber network, when the prefix is firstly assigned to the subscriber network; and
requesting DHCPv6 Renew message to the corresponding authentication server and request to extend an address's preferable time of the prefix upon the expiration of the address's preferable time.

11. An IPv6 terminal comprising:
a processor configured to,
generate Router Solicitation (RS) messages with a Network Service Selection and Authentication (NSSA) Information option, the NSSA Information option contains user's information for network service selection and authentication,
send, via a network interface module, the RS messages to an access node, the access node connected to at least two terminals,
receive, via the network interface module, Router Advertisement (RA) messages from the access node, the RA messages containing a Network Service Provider (NSP) Information option for a NSP edge router, if any one of the at least two terminals authenticated with the NSP through the access node such that the terminal may subsequently use NSP Information option to form a global IPv6 address associated with the terminal irrespective of whether the terminal itself has authenticated with the NSP, the NSP Information option including an address of the NSP edge router and a NSP name and existing in pair with a corresponding Prefix Information option in the RA messages,
process the RA messages, and
store, in a memory, the address of the NSP edge router and the NSP name such that the terminal may subsequently use the address and NSP name to form the global IPv6 address associated with the terminal.

12. An IPv6 access node configured to support a plurality of terminals in a subscriber network connected to a Network Service Provider (NSP), the access node comprising:
a processor configured to,
receive, via a network interface module, RS messages,
extract user information from a Network Service Selection and Authentication (NSSA) Information option in the received RS messages,
contact a corresponding AAA server to make authentication, the authentication with the AAA server being a single authentication session for all of plurality of terminals in the subscriber network, and
store, in a memory, information related to the NSP received in response to the access node authenticating with the AAA server on behalf of one of the terminals,
generate, based on the information related to the NSP, RA messages containing NSP Information option and Prefix Information option, the NSP Information option containing the address of a NSP edge router and a NSP name and the NSP Information option existing in a pair with the corresponding Prefix Information option in the RA messages, and
send the RA messages, via the network interface module, to the subscriber network, the sent RA messages containing the NSP information and the prefix information such that each of the plurality of terminals in the subscriber network may form a global IPv6 address based on the RA messages without authenticating through the access node.

13. An IPv6 terminal in a subscriber network including at least two terminals comprising:
a processor configured to,
receive, via a network interface module, Router Advertisement (RA) messages from an access node, the RA messages include a Network Service Provider (NSP) Information option a NSP edge router, if any one of the at least two terminals authenticated with the NSP through the access node such that the terminal may subsequently use the NSP Information option to form a global IPv6 address associated with the terminal irrespective of whether the terminal itself has authenticated with the NSP, the NSP Information option containing an address of the NSP edge router and a NSP name, the NSP Information option exists in pair with the corresponding Prefix Information option in the RA messages,
process the RA messages,
store, in a memory, the address of the NSP edge router and the NSP name such that the terminal may subsequently use the address and NSP name to form the global IPv6 address associated with the terminal
when the terminal wants to visit a NSP, the processor is further configured to,
determine if the NSP Information option and the corresponding Prefix Information option belonging to the NSP are stored in the memory,
obtain the prefix belonging to the NSP from the memory irrespective of whether the terminal itself has authenticated with the NSP, if the Prefix Information option is stored in the memory, and
obtain the global IPv6 address by appending an interface identifier of the terminal to the prefix.

14. An IPv6 access node comprising:

a processor configured to, generate Router Advertisement (RA) messages in accordance with IPv6 addresses and Network Service Provider (NSP) names stored in a memory, the RA messages contain a NSP Information option, the NSP Information option containing an IPv6 address of a NSP edge router and a NSP name, and in the RA messages the NSP Information option existing in pair with the corresponding IPv6 Prefix Information option, send, via a network interface module, the RA messages to the subscriber network through the NSP Information option and the NSP Information option pair with the corresponding IPv6 Prefix Information option such that such that each of a plurality of terminals in the subscriber network may form a global IPv6 address based on the RA messages without authenticating through the access node.

15. The method as claimed in claim 1, further comprising:

using the NSP information option and the prefix information option to communicate with a desired NSP.

\* \* \* \* \*